United States Patent [19]

Goron

[11] Patent Number: 4,602,998

[45] Date of Patent: Jul. 29, 1986

[54] RAISABLE PLOW ASSEMBLY

[75] Inventor: John Goron, Bridgewater, N.J.

[73] Assignee: Komline-Sanderson Engineering Corporation, Peapack, N.J.

[21] Appl. No.: 749,450

[22] Filed: Jun. 27, 1985

[51] Int. Cl.⁴ .............................................. B01D 33/36
[52] U.S. Cl. .................................... 210/396; 210/400; 209/267; 209/272; 209/307; 209/385
[58] Field of Search ............... 210/396, 400, 401, 783, 210/386, 456; 209/264, 267, 272, 307, 308, 385

[56] References Cited

U.S. PATENT DOCUMENTS

| | | | |
|---|---|---|---|
| 1,207,262 | 12/1916 | Alwart | 209/267 |
| 1,432,738 | 10/1922 | Alwart | 209/267 |
| 1,457,810 | 6/1923 | Alwart | 209/267 |
| 3,420,239 | 1/1969 | Lorenzen | 209/308 |
| 3,984,329 | 10/1976 | Wenzel et al. | 210/396 |
| 4,354,935 | 10/1982 | Austin et al. | 210/396 |
| 4,367,601 | 1/1983 | Latimer et al. | 209/267 |
| 4,456,530 | 6/1984 | Eustacchio et al. | 210/396 |

FOREIGN PATENT DOCUMENTS 1598130  9/1981  United Kingdom ............... 210/396

Primary Examiner—Benoit Castel
Attorney, Agent, or Firm—Watson, Cole, Grindle & Watson

[57] ABSTRACT

Disclosed is a filtering device comprising an endless perforate conveyor belt adapted to carry a liquid-containing material and extract liquid from the material through the belt, and a plow assembly for disrupting the material carried by the belt. The plow assembly comprises a generally horizontally positioned cross-member extending across the width of the belt, the cross-member supporting at least one plow such that the plow is capable of contacting the material carried by the belt, the cross-member is mounted adjacent its ends on slide means that enable the cross-member to be raised and lowered with respect to the perforate belt. The device further includes selectively actuatable member for raising and lowering the cross-member with respect to the belt to thereby move the plows into and out of material contacting position.

15 Claims, 5 Drawing Figures

RAISABLE PLOW ASSEMBLY

BACKGROUND OF THE INVENTION

The present invention relates generally to plow assemblies adapted to ride on the surface of a conveyor belt and, more particularly, to such plow assemblies which include means for raising one or more plows of the plow assembly from the surface of the conveyor belt to facilitate, among other things, cleaning of the plows.

While the present invention will be discussed hereinafter with reference to its use in conjunction with a conveyor type filtering device used for dewatering of sludge, it should be recognized that its use and applicability are not thereby so limited.

A belt-type filtering device used for the dewatering of sludge generally comprises an endless, liquid permeable conveyor belt supported in a generally horizontal position by a perforate guide table. Sludge is deposited on the horizontal belt at one end of the device and as the belt travels, water continually passes through the perforate belt to yield a dewatered sludge at the other end of the device.

It has been found that dewatering in such a device is enhanced if one or more so-called "plows" are fixed above the belt so as to extend into the moving sludge and contact the upper surface of the belt. Such plows tend to evenly distribute the sludge over the surface of the belt, help prevent the formation of solid material layers, and also tend to keep the perforations in the belt open by scraping over or wiping the top surface of the belt. To prevent damage to the plows by impact with large obstacles which may be contained in the sludge, it has been a practice of some to have the plows pivotally mounted on the filtering device such that the plows are capable of pivoting upwardly out of the sludge upon contact with an obstacle.

One problem that has been encountered in the use of plows in conjunction with conveyor-type filtering devices is that, after relatively long periods of use, the plows become encrusted with various matter contained in the sludge and thus, among other things, do not perform their scraping function adequately. In order to clean the plows such as by water spraying, operation of the filtering device must be discontinued, especially in the case of fixed plows. In the case of pivoted plows, if continuous operation of the device is desired, each plow must be pivoted individually for cleaning. Either practice is inefficient and/or time-consuming.

SUMMARY OF THE INVENTION

It is therefore a feature of the present invention to provide a plow assembly which includes means for raising and lowering a row of plows to facilitate, among other things, cleaning of the plows.

It is another feature of the present invention to provide a plow assembly adapted for use with a conveyor-type filtering device wherein the plows are pivotally mounted to a cross-member and are maintained in a vertical operative position by a detent in the plow engaging a depression in the cross-member.

It is yet another feature of the present invention to provide a plow assembly wherein the plows of the assembly are pivotally mounted to a cross-member and each plow has a detent which is adapted to engage one of two depressions on the surface of the cross-member, the engagement of one depression tending to maintain the plow in its vertical operative position and the engagement of the other tending to maintain the plow in a position out of contact with the belt.

Briefly, the present invention in its broader aspects comprehends a filter device comprising an endless perforate conveyor belt adapted to carry a liquid-containing material and extract liquid from the material through the belt, and a plow assembly for disrupting the material carried by the belt, said plow assembly comprising a generally horizontally positioned cross-member extending across the width of the belt, said cross-member supporting at least one plow such that the plow is capable of contacting the material carried by the belt, said cross-member being mounted adjacent its ends on slide means that enables said support cross-member to be raised and lowered with respect to said perforate belt, and selectively actuatable means for raising and lowering said cross-member with respect to said belt, and thereby moving said plows into and out of material contacting position.

The present invention further comprehends a plow assembly adapted for use with an endless perforate conveyor type filtering device which carries liquid containing material and extracts liquid from the material through the belt, the assembly comprising a cross-member of which at least a portion has a generally circular cross-section and has at least one depression on the outer surface thereof, and at least one plow having a generally circular aperture therethrough, said cross-member extending through said aperture such that a depression is within the aperture, said plow having a biased detent extending into said aperture and capable of engaging a depression in the cross-member.

Further objects, advantages and features of the present invention will become more fully apparent from a detailed consideration of the arrangement and construction of the constituent parts as set forth in the following description taken together with the accompanying drawing.

DESCRIPTION OF THE PREFERRED EMBODIMENTS

Figure 1:
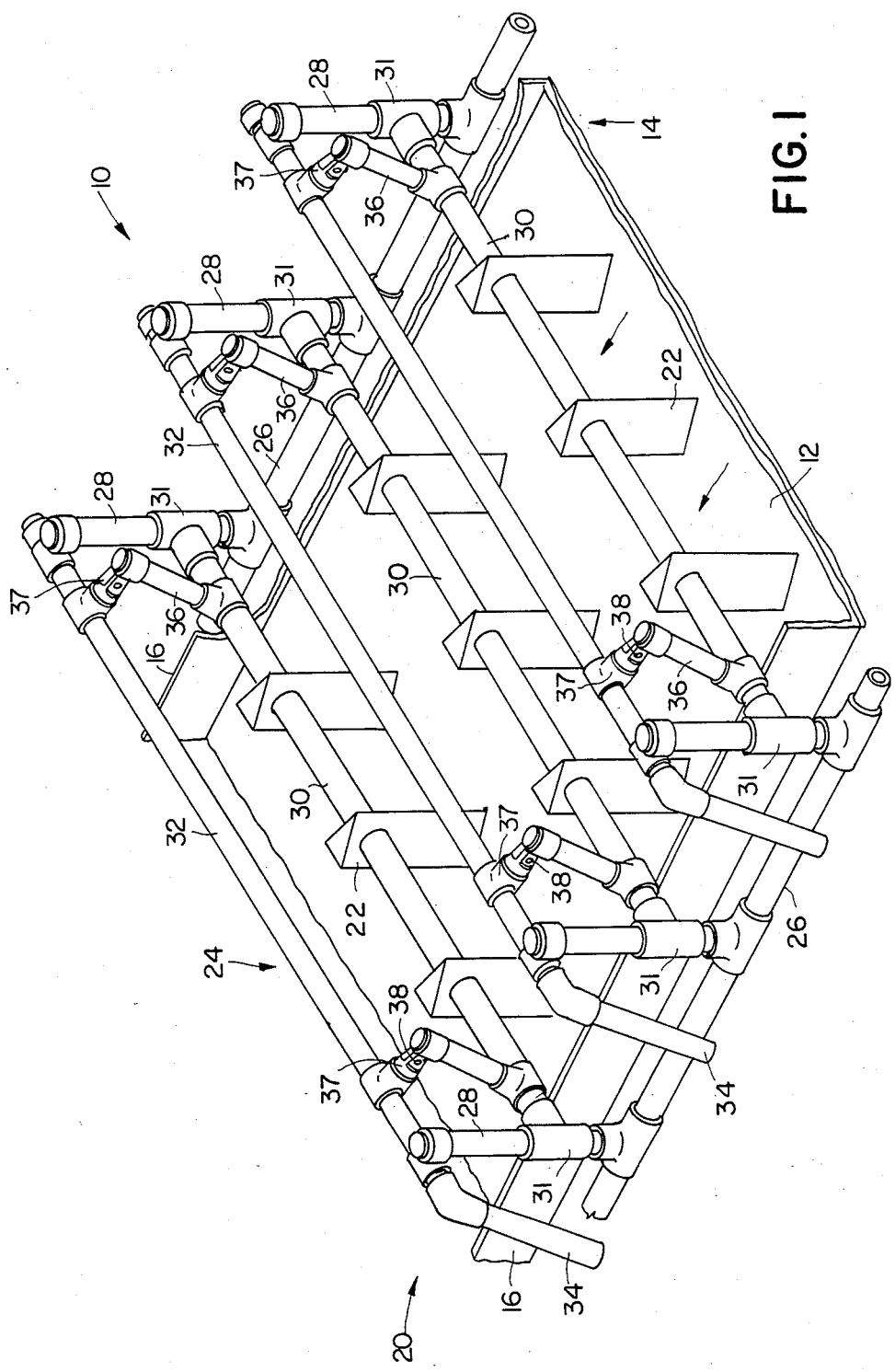
FIG. 1 illustrates plow assembly according to the invention as installed in an endless belt type filtering device.
Figure 2:
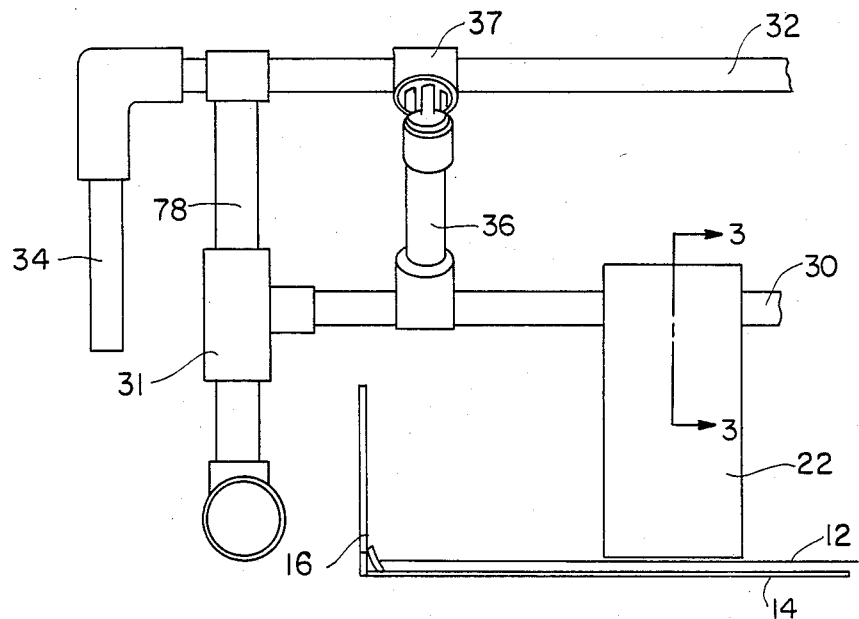
FIG. 2 is a front view of a portion of the plow assembly as shown in FIG. 1.

Referring now to FIGS. 1 and 2, shown is filtering device 10 comprising endless, perforate conveyor belt 12 and guide table 14 having upright side walls 16, one of which is partially broken away for clarity. Belt 12 is driven by means (not shown) and is substantially horizontal. Guide table 14 supports the major horizontal portion of belt 12 and is also pervious to liquid.

Mounted on guide table 14 of filtering device 10 is plow assembly 20 comprising a plurality of plows 22 which are adapted to ride on the upper surface of belt 12 so as to disrupt the flow of the material (not shown)

being transported and filtered by the belt so as to aid in the filtering process. In the embodiment shown, plows 22 are of wedge type shape with the narrowest portion of the wedge facing the direction of flow of the material as indicated by the arrow. The particular shape of plows 22 may vary considerably for the purposes of the present invention. For example, the shape of plows 22 may also be cylindrical, rectangular and the like.

To support plows 22 in the proper position relative to belt 12, assembly 20 includes support frame 24 comprising two rails 26 extending along and attached to side walls 16, each rail having a plurality of uprights 28 mounted thereon. Cross-members 30 extend between upright 28 of one rail 26 to an upright of the other rail. Each end of each cross-member 30 is attached to a T-member 31 which is slidably mounted on upright 28 such that the cross-member can move up and down on the upright. Each cross-member 30 supports at least one plow 22 by extending through an aperture therein in a manner as described below. Plows 22 may be fixed to cross-member 30 or, preferably, are pivotally mounted on the cross-member.

While plow assembly 20 as shown in FIG. 1 includes three cross-members 30 with each cross-member supporting three plows 22, it should be recognized that the plow assembly could include almost any number of cross-members as well as almost any number of plows per cross-member.

Plow assembly 20 further includes means to raise and lower a row of plows 22 relative to belt 12 to facilitate, among other things, cleaning of the plows. In the embodiment shown, the means for raising the row of plows 22 includes shaft 32 rotably mounted on the upper portion of a pair of uprights 28 and handle 34 attached to or integral with one end of the shaft. Cross-member 30 is operatively attached to shaft 32 by transverse shaft arm 36 fixedly attached to the cross-member and transverse member arm 37 fixedly attached to the shaft, the free ends of two transverse arms being jointed in a pivot type connection by pivot pin 38.

When it is desired to elevate plows 22 from the surface of belt 12, one simply rotates handle 34 counter-clockwise which causes shaft 32 and shaft arm 36 to rotate thereby causing cross-member 30 to slide upwardly on uprights 28. While, in the embodiment shown in FIG. 1, handle 34 is adapted to be rotated manually in order to raise plows 22, a suitable source of power such as a motor and the like could also be use to rotate shaft 32. In addition, shafts 32 could be connected together so that all plows 22 could be raised simultaneously.

Figure 3:
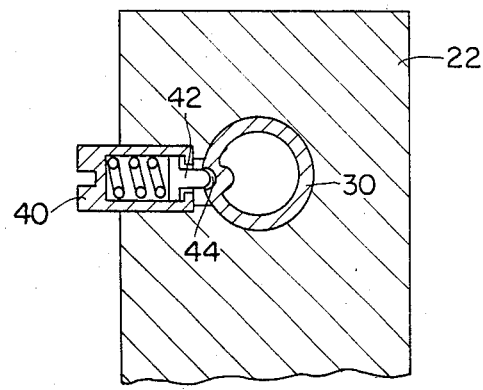
FIG. 3 is a cross-sectional view of a plow of the invention taken along line 3—3 of FIG. 2.

FIG. 3 is a cross-sectional view of the upper portion of plow 22 illustrating an embodiment of means for securing the plow to cross-member 30. In this embodiment, a tapped hole from the exterior of plow 22 to the surface of cross-member 30 is provided and detent 40 is mounted therein by exterior threads engaging the tapped hole. Spring loaded nose 42 of detent 40 projects into depression 44 formed in the wall of cross-member 30.

In operation, plow 22 as shown in FIG. 3 is maintained in a vertical position against the force of the flow of material on filtering device 10 by spring-loaded nose 42 of detent 40 engaging depression 42 in cross-member 30. If, however, plow 22 should strike a large object such as a brick contained in the material, the force generated would be sufficient to move nose 42 out of engagement with depression 44 and allow plow 22 to pivot about cross-member 30. As a consequence, damage to plows 22 and to entire plow assembly 20 is avoided. Once the obstacle has passed, plows 22 will return to their operative position by the force of gravity if they have sufficient mass. Alternatively, plows 22 can be reset manually if the force of gravity is insufficient to return them to the operative vertical position against the flow of material.

Figure 4:
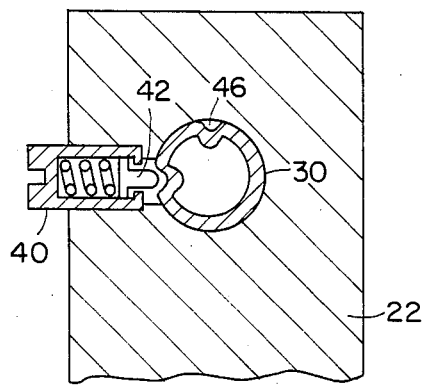
FIG. 4 is a cross-sectional view of another embodiment of a plow according to the present invention.

FIG. 4 illustrates another embodiment of a plow according to the invention which is very similar to the one shown in FIG. 3. In this embodiment, cross-member 30 is provided with a second depression 46 which is located in the path of nose 42 of detent 40 as plow 22 is pivoted about cross-member 30 by contact with an obstacle or the like. With second depression 46, plow 22 will be locked in a non-vertical position after pivoting in response to contact with an obstacle and thus will alert the operator of filtering device 10 that an obstacle is being carried by belt 12. After removal of the obstacle by the operator, plow 22 can then be manually returned to its operative vertical position.

Figure 5:
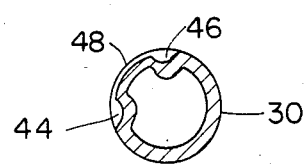
FIG. 5 is a cross-sectional view of another embodiment for a cross-member to be used in conjunction with the plows shown in FIGS. 3 and 4.

The embodiment of cross-member 30 shown in FIG. 5 is somewhat similar to the cross-member 42 of FIG. 4 in that the cross-member is provided with two depressions 44 and 46 such that a plow 22 can be locked or latched in the vertical operative position as well as in a position where the plow is out of contact with material on a conveyor belt. However, in FIG. 5, cross-member 30 is provided with guideway 48 between depressions 44 and 46 which is shallower than the depressions. Guideway 48 thus controls the travel of nose 42 of detent 40 from one depression to another to ensure that the detent will engage the depression.

The depressions in cross-members 30 may take the form of an axially extending groove as is shown in FIG. 4 or they may be a dimple as shown in FIG. 3 or even a drilled hole in the wall of the cross-member (not shown). An advantage of the groove form for the depressions is that return engagement of the detent into a depression once engagement has been released is much easier and accurate realignment with a single dimple or hole is not required.

In another preferred embodiment of the invention, the plows used are of the type dislosed in copending patent application Ser. No. 763,278 filed Aug. 7, 1985 of Raymond Morales entitled "Rotatary Plow Assembly", assigned to the same assignee as the subject application, which relates to a plow construction that enables the plow body to rotate as well as to move vertically upon contact with a solid object.

While there has been shown and described what is considered to be preferred embodiments of the present invention, it will be apparent to those skilled in the art that various changes and modifications may be made therein without departing from the invention as defined in the appended claims.

It is claimed:

1. A filtering device comprising an endless perforate conveyor belt adapted to carry a liquid-containing material and extract liquid from the material through the belt, and a plow assembly for disrupting the material carried by the belt, said plow assembly comprising:

(a) a generally horizontally positioned cross-member extending across the width of the belt, said cross-member supporting at least one plow such that the plow is capable of contacting the material carried by the belt, said cross-member being mounted adjacent its ends on slide means that enable said cross-member to be raised and lowered with respect to said perforate belt, and (b) selectively actuatable means for raising and lowering said cross-member with respect to said belt, and thereby moving said plows into and out of material contacting position.

2. A filtering device in accordance with claim 1, wherein the means for raising and lowering the cross-member comprises a rotatable shaft extending generally parallel to the cross-member, the shaft connected to the cross-member by at least one arm member.

3. A filtering device in accordance with claim 2, wherein a handle is connected to the shaft.

4. A filtering device in accordance with claim 2, wherein the shaft is connected to the cross-member by two arm members pivotally joined to each other.

5. A filtering device in accordance with claim 1, wherein at least a portion the cross-member has a generally circular cross-section and the plow has a generally circular aperture with the generally circular portion of the cross-member extending therethrough.

6. A filtering device in accordance with claim 5, wherein the generally circular portion of the cross-member has at least one depression therein which is located within the aperture of the plow, and the plow has a biased detent extending into the aperture and capable of engaging the depression in the cross-member.

7. A filtering device in accordance with claim 6, wherein the generally circular portion of the cross-member includes two depressions.

8. A filtering device in accordance with claim 7, wherein the two depressions are connected by a guideway.

9. A filtering device in accordance with claim 6, wherein the depression in the cross-member is an axially-extending groove.

10. A plow assembly adapted for use with an endless perforate conveyor type filtering device which carries liquid containing material and extracts liquid from the material through the belt, the assembly comprising a cross-member at least a portion of which has a generally circular cross-section and has at least one depression on the outer surface thereof and at least one plow having a generally circular aperture therethrough, said cross-member extending through said aperture such that a depression is within the aperture, said plow having a biased detent extending into said aperture and capable of engaging a depression in the cross-member.

11. A plow assembly in accordance with claim 10, wherein at least a portion of the cross-member has a generally circular cross-section and the plow has a generally circular aperture with the generally circular portion of the cross-member extending therethrough.

12. A plow assembly in accordance with claim 11, wherein the generally circular portion of the cross-member has at least one depression therein which is located within the aperture of the plow, and the plow has a biased detent extending into the aperture and capable of engaging the depression in the cross-member.

13. A plow assembly in accordance with claim 12, wherein the generally circular portion of the cross-member includes two depressions.

14. A plow assembly in accordance with claim 13, wherein the two depressions are connected by a guideway.

15. A plow assembly in accorance with claim 12, wherein the depression in the cross-member is an axially-extending groove.

* * * * *